Feb. 16, 1937. H. E. BARTSCH 2,071,269
HAND BRAKE
Filed May 15, 1935 4 Sheets-Sheet 4
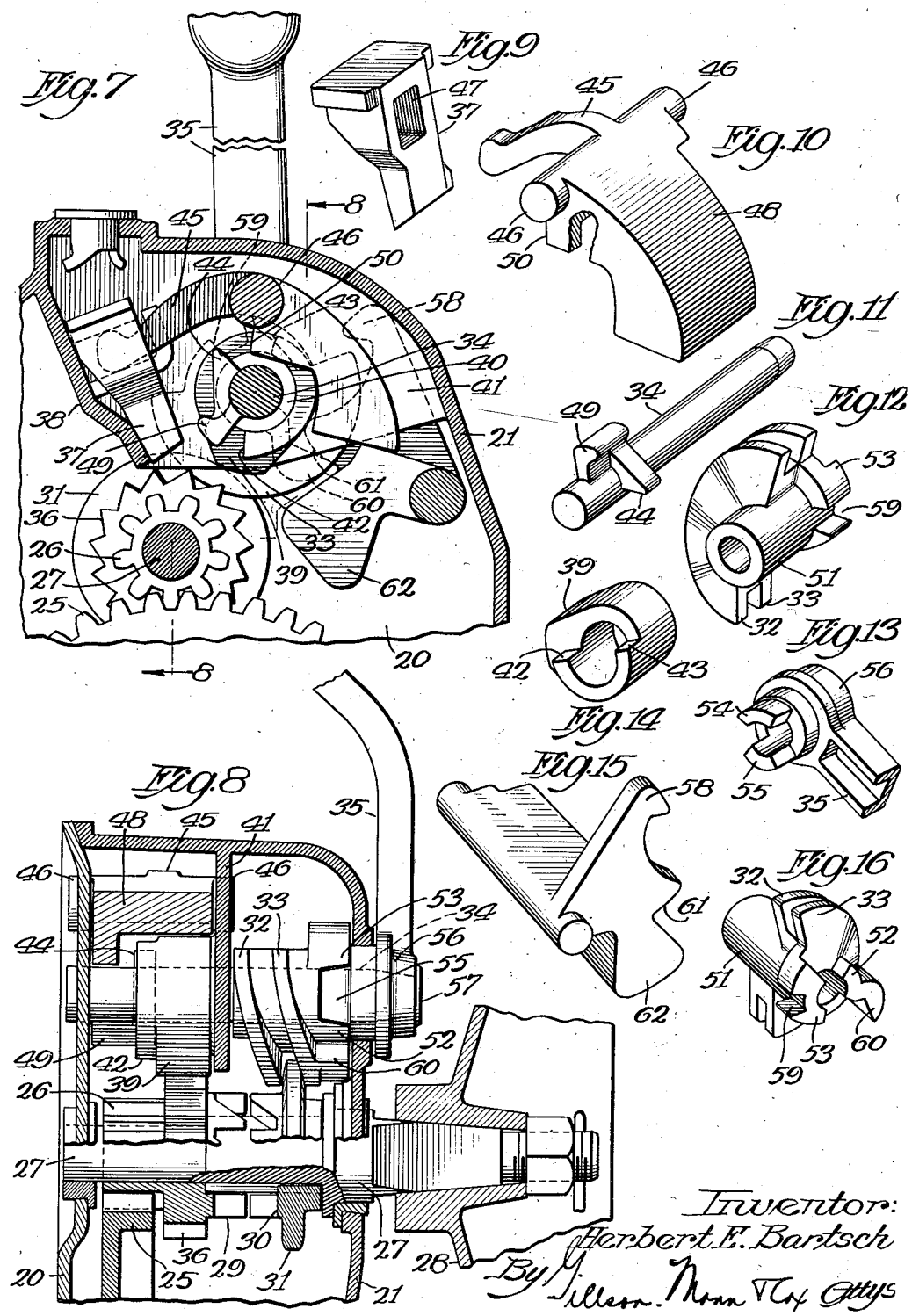
Inventor:
Herbert E. Bartsch

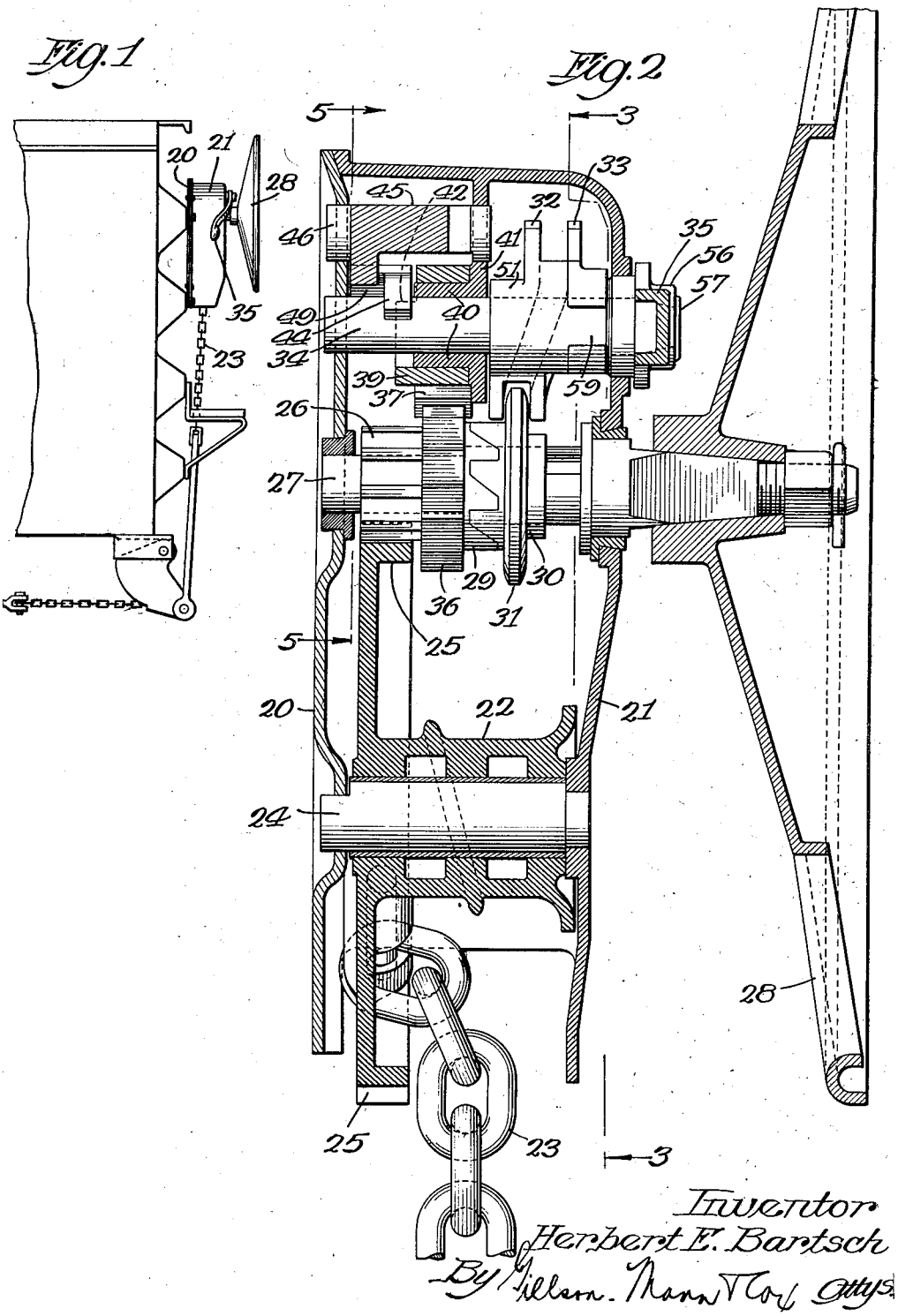

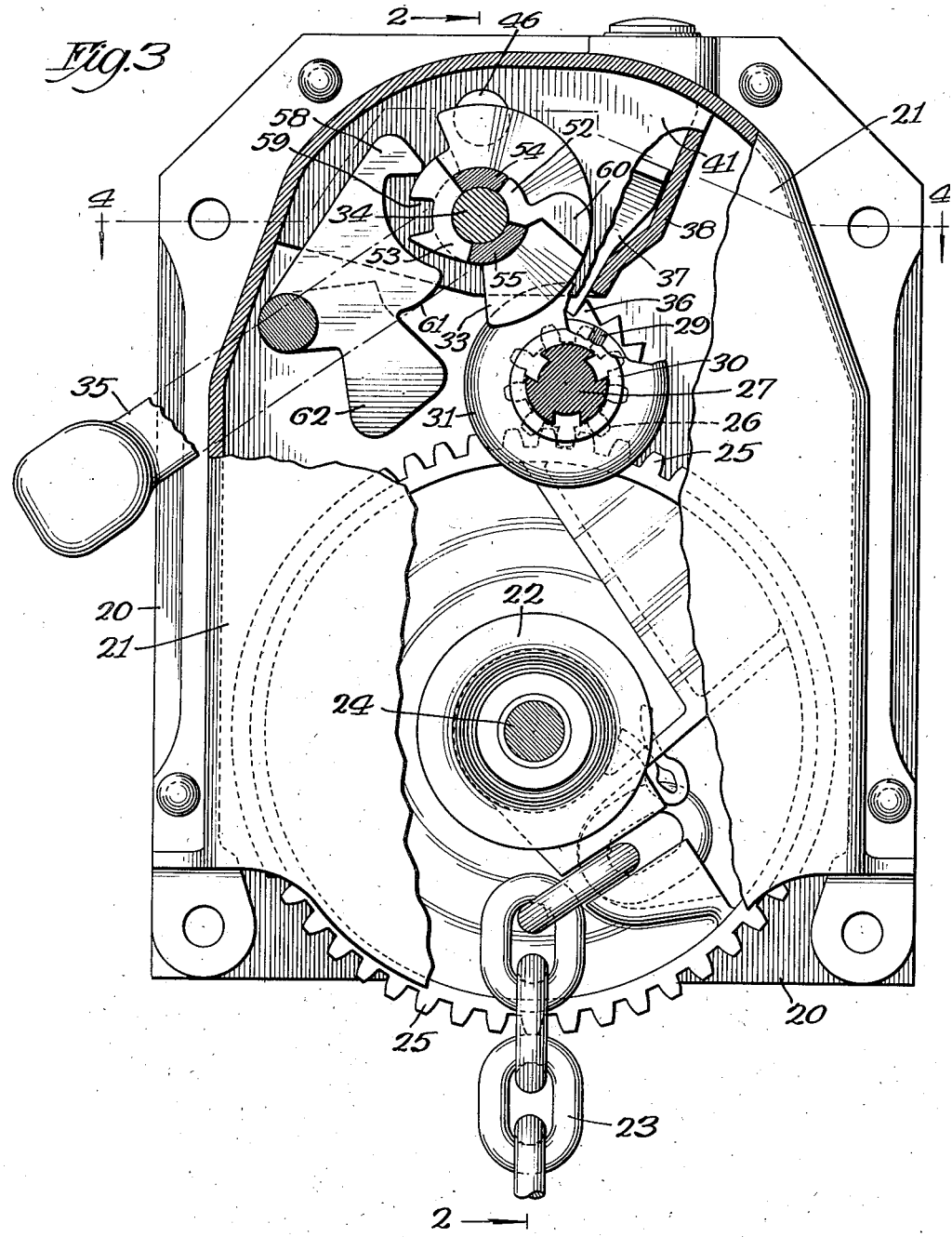

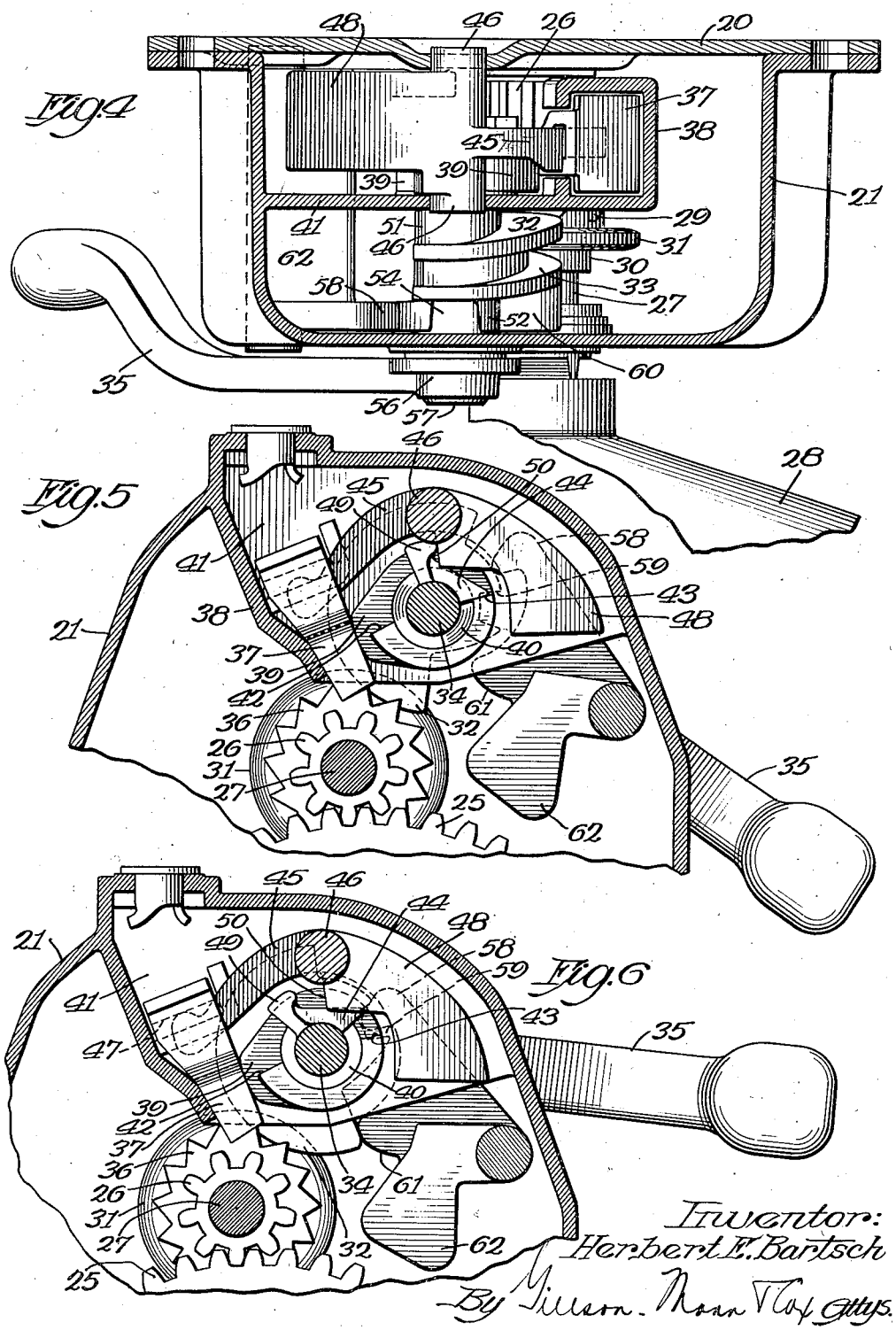

UNITED STATES PATENT OFFICE 2,071,269

HAND BRAKE

Herbert E. Bartsch, Chicago, Ill., assignor to Universal Draft Gear Attachment Co., a corporation of Illinois Application May 15, 1935, Serial No. 21,601

6 Claims. (Cl. 74—505)

The invention relates to the type of hand brake operating mechanism for railway cars which is attached to a vertical wall of the car and actuated by means of a hand wheel turning on a horizontal axis, the mechanism comprising a winding drum to which the pull rod of the brake is connected.

The general object of the invention is to improve the operation of the mechanism and provide for its easy control.

The various advantages secured by the invention are pointed out in connection with its description.

In the accompanying drawings,

Fig. 1 is a detail, side elevation of a freight car with the brake mechanism to which this invention relates, mounted thereon;

Fig. 2 is a sectional view on the line 2—2 of Fig. 3;

Fig. 3 is a sectional view on the line 3—3 of Fig. 2;

Fig. 4 is a sectional view on the line 4—4 of Fig. 3;

Fig. 5 is a sectional view on the line 5—5 of Fig. 2;

Figs. 6 and 7 are similar views on the same line but with the parts in different positions;

Fig. 8 is a detail section on the line 8—8 of Fig. 7; and

Figs. 9 to 16 inclusive are views in perspective of various elements of the mechanism.

The brake actuating mechanism is enclosed within a housing comprising a back plate 20, which may be bolted to a car, and a front casing or shell 21 fixedly attached to the back plate and enclosing all parts of the operating mechanism except the hand wheel and control lever.

A winding drum 22, to which is attached a chain 23, forming a part of the connection of the actuating mechanism with the brake mechanism, is journaled on a shaft 24, fixed in the back and front walls of the housing. A gear wheel 25, associated with the drum 22 and preferably, as shown, cast integral therewith, meshes with a pinion 26, loosely journaled on the shaft 27 of the hand wheel 28, this shaft being journaled in the back and front walls of the housing. The forward radial face of the pinion 26 is equipped with an annular series of clutch teeth 29, which cooperate with a clutch element 30, splined upon the shaft 27 and having an annular flange 31, which extends between a pair of cam flanges 32, 33, mounted upon a shaft 34, journaled in the back and front walls of the housing and carrying at its forward end a control arm 35.

The pinion 26 is provided with an annular series of ratchet teeth 36, located between its gear teeth and clutch teeth, and which cooperate with a holding pawl 37, mounted for sliding movement upon a web 38, cast integral with the casing 21.

The pawl 37 engages the ratchet teeth 36 by a thrust movement, and is held against lateral movement under the influence of the load imposed upon it by the ratchet wheel by an oscillatable abutment, as 39, mounted upon a sleeve 40, formed upon a portion 41 of the web 38, and serving as a bearing for the shaft 34. The hub of the abutment 39 projects beyond the end of the sleeve 40, this projecting end, however, being cut away through half of the circumference to form shoulders 42, 43, engageable by a finger 44 and lug 49, formed on the shaft 34, by means of which the abutment may be turned to and from its pawl-engaging position, as shown in Figs. 5 and 6, to its inactive position, as shown in Fig. 7.

The pawl 37 is raised out of engagement with the ratchet wheel by a counterweighted arm 45, having trunnions 46, 46, which are journaled, respectively, in the back wall 20 of the housing, and a section 41 of its internal web. The arm 45 engages loosely in an aperture 47 in the pawl 37, and hence when raised under the influence of its counterweighted end 48 lifts the pawl out of engagement with the ratchet wheel 36. When the control arm 35 is in its fully retracted position (Figs. 4 and 5), the abutment is brought to its advance or pawl-engaging position by the finger 44 coming into engagement with the shoulder 43, and the arm 45 is swung downwardly to permit the engagement of the pawl 37 with the ratchet wheel by the contact of the lug 49 on the shaft 34 with a shoulder 50 on the counterweight 48.

The clutch shifting cam flanges 32, 33, are so positioned on the shaft 34 that when the arm 35 is in the fully retracted position, the clutch is engaged, as shown in Fig. 2, and when in full release position, as shown in Fig. 7, the clutch is disengaged, as shown in Fig. 8.

The cam flanges 32, 33 are formed upon a sleeve 51, which fits upon the shaft 34 and is fixed against turning movement relatively thereto by the engagement of a pair of segments 52, 53, projecting from the outer end of the sleeve 51, with complementary segments 54, 55, projecting inwardly from the hub 56 of the control arm 35. This control arm and the shaft 34 may be conveniently locked against relative turning movement by upsetting the end of the shaft after the parts are assembled, as indicated at 57.

It sometimes becomes necessary to gradually release a brake, as when a car is being shunted in the yard in the making up of a train and the brakeman finds that the brake friction is likely to stop the car before it has reached its objective. To permit such action a counterweighted detent 58, for holding the clutch elements in engagement, is provided, being pivoted in the front and rear walls of the casing in position to cooperate with the recess 59 formed in a flange on the shaft section 51.

The control arm being shifted to the position of Fig. 6, to withdraw the shoulder 49 from the shoulder 50 of the counterweighted arm 45, the pawl 37 is lifted out of engagement with the ratchet, the brakeman holding the hand wheel to control the release, and returning the arm 35 to the position of Fig. 5 when he desires to retain the braking action at its reduced pressure.

To effect full release the control arm 35 is thrown to the vertical position (Fig. 7), the wheel 28 being urged by hand to relieve the pressure on the pawl 37. The detent 58 is disengaged from the notch 59 by the cam action of the meeting faces of these parts; the clutch elements are separated as shown in Fig. 8; the pawl is raised by the arm 45, and the abutment 39 is turned backwardly. The disengagement of the pawl from the ratchet leaves the drum 22 free to turn. The movement of the arm 35 past the vertical is prevented by the engagement of a lug 60, on the clutch control assembly, with the shoulder 61 on the arm of the detent 58.

The control arm is now counterweighted by the heavy lower end 62 of the detent 58, and falls by gravity to the position of Fig. 3, the rapid movement of the arm preventing the detent 58 from entering the notch 59. This causes the reengagement of the clutch elements and brings the pawl into engagement with the ratchet wheel, the abutment being shifted to a position to cooperate with the pawl by the engagement of the finger 44 with the shoulder 43.

While the construction shown and described is highly efficient, the specific mechanism for connecting the control shaft with the clutch and ratchet devices may be varied. The novelty resides broadly in the timing of these parts.

In the usual operation of the controlling mechanism, the brake is set up by the rotation of the hand wheel, and is held so long as may be desired by the ratchet mechanism. It may be released by throwing the control lever to the upright position, the clutch being first disengaged, the ratchet mechanism continuing to hold the load, notwithstanding the backward movement of the lug 49 from the shoulder 50 of the counterweighted arm because the abutment will be frictionally held in engagement with the pawl, which is still under pressure from the ratchet wheel. As the control handle approaches the upright position, the lug 49 comes into engagement with the shoulder 42 of the abutment, and the latter is turned out of engagement with the pawl and the ratchet wheel is free to turn. In the normal or more usual releasing operation of the brake mechanism, there occurs, therefore, no backward turning of the hand wheel.

The ratchet wheel being associated with the pinion for turning the drum, sustains the load of the set brake independently of the clutch and permits the release of the latter with but slight effort, and consequently slight wear of the parts.

For gradual release, the control arm 35 is moved to the position of Fig. 6, withdrawing the lug 49 from the shoulder 50, the clutch mechanism, however, remaining engaged. By slightly increasing the brake tension, the pawl is released from pressure of the ratchet wheel and is at once moved out of engagement with this wheel by the counterweighted lifting arm. The release of the brake may now be gradually accomplished by permitting the slow reverse movement of the hand wheel.

What I claim is:—

1. In a hand brake operating mechanism, in combination, a hand wheel, a winding drum, gearing connecting the hand wheel and drum, a ratchet wheel carried by the gearing, a longitudinally reciprocable pawl cooperating with the ratchet wheel, a counterweighted oscillatable abutment for laterally engaging the pawl, a gravity actuated element for withdrawing the pawl from engagement with the ratchet wheel, a clutch for connecting the hand wheel with the gearing, a cam shaft for controlling the clutch, a counterweighted detent for checking the releasing movement of the cam shaft, and means carried by the cam shaft for controlling the action of the counterweighted elements.

2. In a hand brake operating mechanism, in combination, a hand wheel, a winding drum, gearing connecting the hand wheel and drum, a ratchet wheel carried by the gearing, a longitudinally reciprocable pawl cooperating with the ratchet wheel, a counterweighted oscillatable abutment for laterally engaging the pawl, a gravity actuated element for withdrawing the pawl from engagement with the ratchet wheel, a clutch for connecting the hand wheel with the gearing, a cam shaft for controlling the clutch, a counterweighted detent for checking the releasing movement of the cam shaft, and means carried by the cam shaft for controlling the action of the counterweighted elements and arranged to release such elements to effect the disengagement of the clutch.

3. Hand brake operating mechanism comprising a winding drum, gearing for turning the drum, a hand wheel, clutch mechanism connecting the hand wheel with the gearing, ratchet mechanism for holding the gearing independently of the clutch, a hand lever and means actuated by the lever for controlling the clutch and the ratchet mechanisms and arranged to engage or disengage the elements of both when in its extreme positions and each individually when in different intermediate positions, such lever being counterweighted to automatically return it to full engaging position for both of such mechanisms.

4. Hand brake operating mechanism comprising a winding drum, gearing for turning the drum, a hand wheel, clutch mechanism connecting the hand wheel with the gearing, ratchet mechanism for holding the gearing independently of the clutch, a hand lever and means actuated by the lever for controlling the clutch and the ratchet mechanisms and arranged to engage or disengage the elements of both when in its extreme positions and each individually when in different intermediate positions.

5. Hand brake mechanism comprising a winding drum, gearing for turning the drum, a manually controlled shaft for actuating the gearing, clutch mechanism connecting such shaft with the gearing, ratchet and pawl mechanism for holding the gearing independently of the clutch, a counterweighted arm for disengaging the pawl from the ratchet, an oscillatable shaft for controlling the clutch and ratchet mechanisms, such shaft having a cam oblique to its axis and engageable with the movable element of the clutch, and a finger for lifting the counterweight of the arm, the arm and finger being so related circumferentially to the shaft that the release of the clutch occurs in advance of the release of the pawl.

6. Hand brake mechanism comprising a winding drum, gearing for turning the drum, a manually controlled shaft for actuating the gearing, clutch mechanism connecting such shaft with the gearing, ratchet and pawl mechanism for holding the gearing independently of the clutch, a counterweighted arm for disengaging the pawl from the ratchet, an oscillatable shaft for controlling the clutch and ratchet mechanisms, such shaft having a cam oblique to its axis and engageable with the movable element of the clutch, and a finger for lifting the counterweight of the arm, the arm and finger being so related circumferentially to the shaft that the release of the clutch occurs in advance of the release of the pawl, the oscillatable shaft being counterweighted to automatically return to the position for engaging the clutch elements and advancing the pawl.

HERBERT E. BARTSCH.